July 25, 1961 M. R. GINSLEY ET AL 2,993,465
WARNING BARRIER
Filed July 13, 1959 2 Sheets-Sheet 1
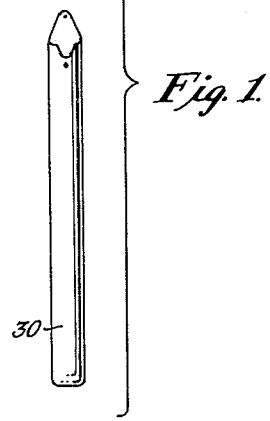
Fig. 1.
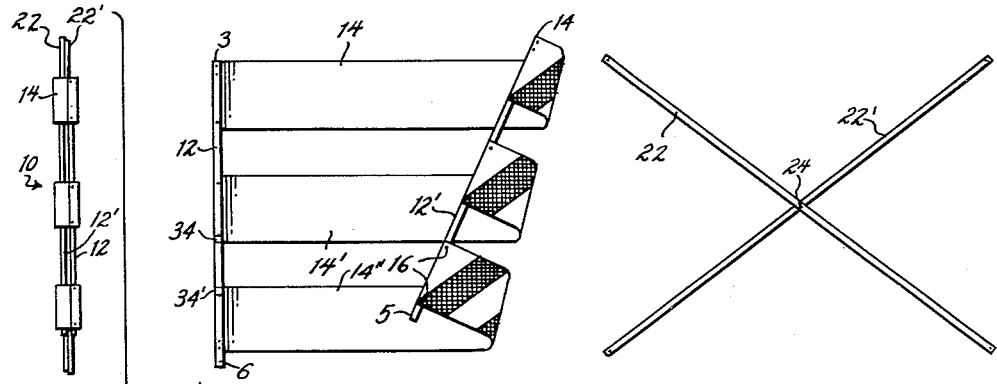
Fig. 2.
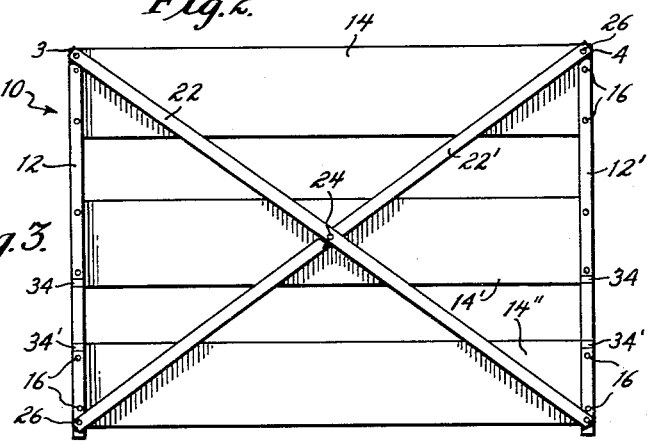
Fig. 3.
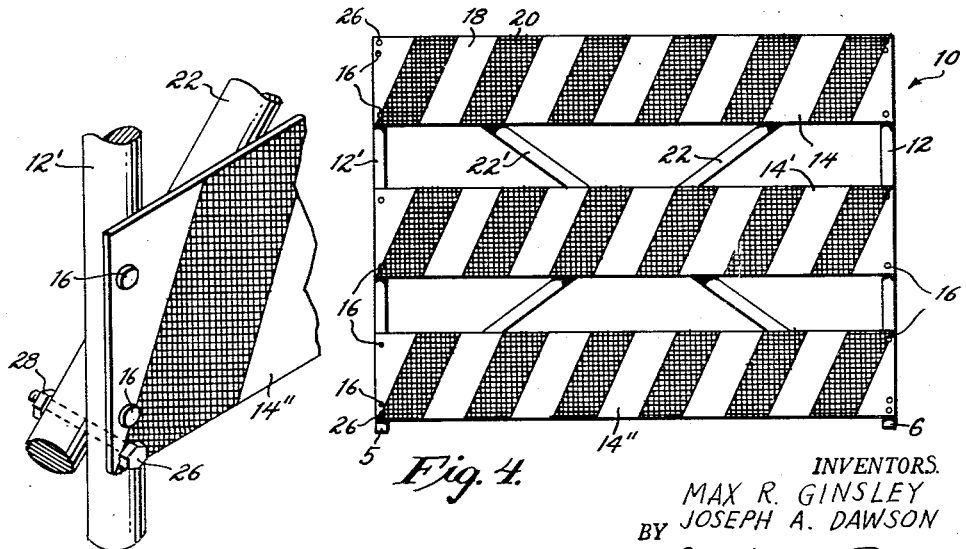
Fig. 4.
Fig. 5.
INVENTORS.
MAX R. GINSLEY
BY JOSEPH A. DAWSON
Arthur H. Seidel
ATTORNEY.

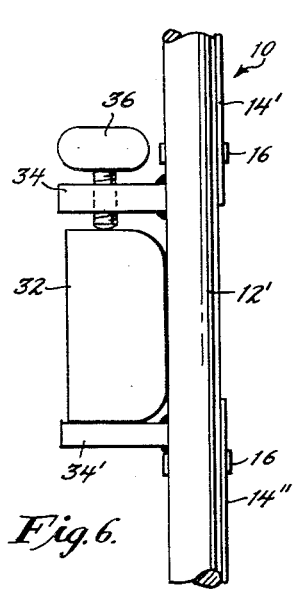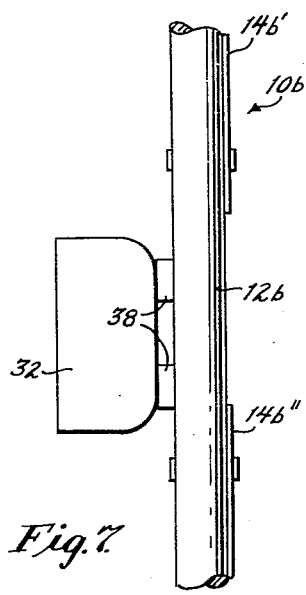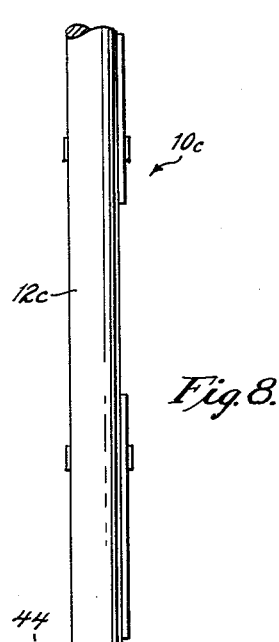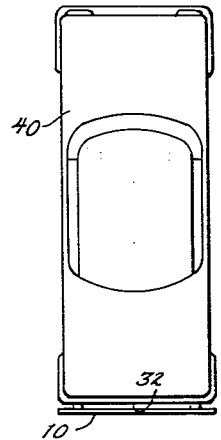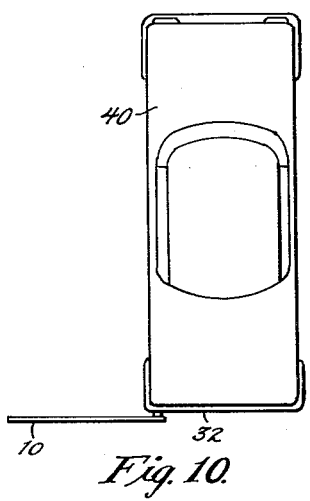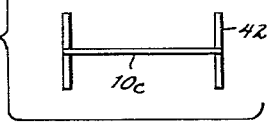

United States Patent Office 2,993,465
Patented July 25, 1961

2,993,465
WARNING BARRIER
Max R. Ginsley, 1915 W. Erie Ave., Philadelphia, Pa., and Joseph A. Dawson, 69 Harley Road, Lansdowne, Pa.
Filed July 13, 1959, Ser. No. 826,884
5 Claims. (Cl. 116—63)

The present invention relates to a warning barrier, and more particularly to a collapsible warning barrier.

When an automobile becomes disabled on a crowded highway or street because of a flat tire or engine difficulties, it often becomes necessary for the motorist to place himself in a dangerous position with regard to the traffic on the highway in order to repair the disability. For such a circumstance, it would be desirable to have a warning barrier which would protect the motorist from the traffic on the highway while he made the necessary repairs. A barrier for this purpose must be large enough to be seen by other drivers so as to provide the desired protection, and should be collapsible so that it can be stored in a small space. Such a warning barrier is not only useful for motorists, but is also useful for householders, businessmen, contractors, and the like as a warning of broken pavements, obstructions, and other hazardous conditions.

It is an object of the present invention to provide a novel warning barrier.

It is another object of the present invention to provide a collapsible warning barrier which in its collapsed condition can be stored in a small space.

It is a further object of the present invention to provide a collapsible warning barrier which can be either attached to an automobile, or is self-supporting.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a view of the warning barrier of the present invention in its collapsed condition as it is being removed from a carrying case.

FIGURE 2 is an enlarged view of the warning barrier of the present invention as it is being unrolled for assembly.

FIGURE 3 is a further enlarged rear elevational view of the assembled warning barrier of the present invention.

FIGURE 4 is a front elevational view of the assembled warning barrier of the present invention.

FIGURE 5 is an enlarged detail perspective view of a broken-away portion of one of the bottom corners of the warning barrier of the present invention.

FIGURE 6 is an enlarged partial side elevational view of a portion of the preferred embodiment of the warning barrier of the present invention attached to the bumper of an automobile.

FIGURE 7 is an enlarged partial side elevational view of a portion of another embodiment of the warning barrier of the present invention attached to the bumper of an automobile.

FIGURE 8 is an enlarged partial side elevational view of a lower portion of still another embodiment of the warning barrier of the present invention which is self-supporting.

FIGURE 9 is a top plan view illustrating one manner of using the warning barrier of the present invention with an automobile.

FIGURE 10 is a top plan view illustrating another manner of using the warning barrier of the present invention with an automobile.

FIGURE 11 is a top plan view illustrating still another manner of using the warning barrier of the present invention with an automobile.

Referring initially to FIGURES 2–5, the warning barrier of the present invention is generally designated as 10.

Warning barrier 10 comprises a pair of side rods 12 and 12' of wood or metal. The word rod is to be given its conventional meaning, that is, an elongated member of uniform cross-section. Three strips 14, 14' and 14" of a flexible material such as cotton, canvas, or plastic, are connected in spaced, parallel relation between the side rods 12 and 12'. The ends of the flexible strip 14 are secured to the side rods 12 and 12' by fasteners 16 which may be rivets or nails. The strip 14 is secured to the top ends 3 and 4 respectively of the side rods 12 and 12'. The strip 14" is spaced slightly from the bottom ends 5 and 6 of the side rods 12' and 12 respectively. As shown more clearly in FIGURE 4, each of the strips 14, 14' and 14" is provided on its front face with alternating colored stripes 18 and 20 which extend diagonally across the strips 14. The colored stripes 18 and 20 are preferably of luminescent yellow and black for maximum daylight visibility, and night time reflectibility.

A pair of spreader rods 22 and 22' are pivotably connected together midway along their length by a pivot pin or rivet 24. Spreader rods 22 and 22' are of a length to extend diagonally between the opposite ends of the side rods 12 and 12' when the sidet rods 12 and 12' are spaced apart the full length of the flexible strips 14, 14' and 14". The ends of the spreader rods 22 and 22' are secured to end portions of the side rods 12 and 12' by bolts 26 which extend through the side rods 12 and 12' and the spreader rods 22 and 22'. A nut 28 is threaded on the end of each of the bolts 26 to secure the spreader rod 22 on the bolts 26. The structural interrelationship of the spreader rod 22, the bolt 26 and the nut 28 are shown more clearly in FIGURE 5. It will be appreciated that all of the end portions of the rods 22 and 22' are structurally interrelated with the side rods 12 and 12' in the manner shown in FIGURE 5. Thus, the spreader rods 22 and 22' secure the side rods 12 and 12' in parallel relation with the flexible strips 14, 14' and 14" being in their full extended position.

When the barrier 10 of the present invention is not in use, the spreader rods 22 and 22' are disconnected from the side rods 12 and 12' by removing the bolts 26. The side rod 12' is rolled up in the flexible strips 14, 14' and 14" to provide the compact arrangement shown in FIGURE 1. The spreader rods 22 and 22' are pivoted with respect to each other until the spreader rods 22 and 22' are parallel to each other. The warning barrier 10 can then be inserted in a carrying case 30 which can be easily stored in the trunk of an automobile.

As shown more clearly in FIGURE 6, the warning barrier of the present invention is adapted to be attached to the bumper 32 of an automobile. Each of the side rods 12 and 12' of the warning barrier 10 has a pair of longitudinally spaced, parallel flanges 34 and 34' secured thereto. The flanges 34 and 34' extend perpendicularly from the side rod 12' away from the flexible strips, and the flanges 34 and 34' are spaced apart a distance slightly greater than the height of the bumper 32. A thumb screw 36 is threaded downwardly through the topmost flange 34. To mount the warning barrier 10 on an automobile, the flanges 34 and 34' of one or both of the side rods 12 and 12' are placed around the bumper 32 of the automobile. The thumb screw 36 is then threaded down against the top of the bumper 32 until the flange 34' is pulled tightly against the bottom of the bumper 32. Thus, the side rods 12 and 12' of the warning barrier 10 are tightly clamped to the bumper 32 to support the warning barrier 10 in an upright position.

Referring to FIGURE 7, there is shown another embodiment of the warning barrier of the present invention, generally designated as 10b, which is adapted to be mounted on the bumper 32 of an automobile. The warning barrier 10b is identical with the warning barrier 10 except as pointed out hereinafter. The warning barrier 10b has a pair of identical side rods comparable to rods 12 and 12'. For purposes of clarity, only the side rod 12b is shown in FIGURE 7. The side rod 12b of the warning barrier 10b has a pair of permanent magnets 38 secured thereto. As shown more clearly in FIGURE 7, the magnets 38 are secured to the side rod 12b opposite the flexible strips 14b' and 14b''. The warning barrier 10b is mounted on the bumper 32 by placing the side rods, only side rod 12b is shown in FIGURE 7, against the bumper 32 with the magnets 38 contacting the bumper 32. The magnets 38 attract the bumper 32 and thereby secure the warning barrier 10b in an upright position on the bumper 32.

FIGURES 9 and 10 show various ways of using the embodiments 10 and 10b of the present invention. As shown in FIGURE 9, the warning barrier 10 can be placed entirely across an end of the automobile 40 with both of the side rods 12 and 12' of the warning barrier 10 being clamped to the bumper 32 of the automobile 40. As shown in FIGURE 10, the warning barrier 10 can be clamped to the bumper 32 of the automobile 40 by only one of the side rods 12 and 12' with the warning barrier 10 projecting beyond the side of the automobile 40. This method of attaching the warning barrier 10 to the automobile 40 provides a shield for the driver of the automobile as he works along the side of the automobile to change a tire or repair the engine of the automobile.

Referring to FIGURE 8, there is shown still another embodiment of the warning barrier of the present invention, generally designated as 10c, which is self-supporting. The warning barrier 10c is identical with the warning barrier 10 except as will be pointed out hereinafter. The warning barrier 10c has a pair of identical side rods which are comparable to the side rods 12 and 12', with only one such side rod being shown in FIGURE 8. The side rod 12c of the warning barrier 10c is provided with a horizontally extending foot 42. Each foot 42 comprises a rod having a socket 44 extending transversely therethrough midway between the ends of the foot 42. The bottom end of the side rod 12c is slidably inserted in the socket 44 in the foot 42. Thus, when the warning barrier 10c is in its assembled condition, the feet 42 will support the warning barrier 10c in an upright position. When the warning barrier 10c is disassembled, the feet 42 can be removed from the side rods 12c. The feet 42 can then be inserted in the carrying case 30 along with the rest of the warning barrier 10c.

FIGURE 11 illustrates a manner in which the warning barrier 10c can be used to protect the driver who may be making repairs to his automobile 40.

The present invention may be embodied in other specific forms without departing from the spirit or essential attributes thereof and, accordingly, reference should be made to the appended claims, rather than to the foregoing specification as indicating the scope of the invention.

We claim:

1. A collapsible warning barrier comprising a pair of substantially parallel side rods, a plurality of strips of flexible cloth-like material, the ends of said strips being in engagement with and fixedly secured to a separate one of said side rods, said flexible strips being in spaced parallel relation, a pair of crossed spreader rods, said spreader rods being connected together intermediate their ends, removable elements detachably connecting each end portion of said spreader rods to a portion of a separate one of said side rods with said spreader rods extending diagonally between said side rods, and bumper engaging elements intermediate the ends of each side rod, said bumper engaging elements being fixedly secured to their respective side rods, said bumper engaging elements extending in a direction perpendicular to the longitudinal axis of said side rods, said bumper engaging elements having thereon securing means for holding the same in contact with a bumper.

2. A warning barrier in accordance with claim 1 wherein said bumper engaging elements comprise a pair of longitudinally spaced flanges, and a clamping screw threaded through only one of the flanges on each of said side rods.

3. A warning barrier in accordance with claim 1 wherein said bumper engaging elements comprise a pair of spaced permanent magnets on each of said side rods.

4. A warning barrier in accordance with claim 1 in which each of said flexible strips is provided on its front surface with stripes of alternating contrasting colors, said stripes extending diagonally across said flexible strips.

5. A warning barrier in accordance with claim 4 in which said alternating colored stripes are luminescent yellow and black.

References Cited in the file of this patent

UNITED STATES PATENTS

| 1,705,052 | Viscount | Mar. 12, 1929 |
| 2,431,108 | Carleton | Nov. 18, 1947 |
| 2,802,443 | Hanson | Aug. 13, 1957 |
| 2,887,983 | Budd | May 26, 1959 |

FOREIGN PATENTS

| 268,908 | Great Britain | Apr. 14, 1927 |
| 290,200 | Switzerland | July 16, 1953 |